United States Patent
Haikin et al.

(10) Patent No.: US 6,512,845 B1
(45) Date of Patent: Jan. 28, 2003

(54) ITERATIVE APPROXIMATION OF COLOR PATCH AREA

(75) Inventors: John S. Haikin, Fremont, CA (US); Timothy L. Kohler, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/357,142

(22) Filed: Jul. 20, 1999

(51) Int. Cl.[7] .................................................. G06K 9/00
(52) U.S. Cl. ....................... 382/165; 382/257; 358/406; 358/504
(58) Field of Search ................................. 382/164, 162, 382/165, 112, 256, 258; 358/406, 504; 250/559.01, 559.04, 559.1

(56) References Cited

U.S. PATENT DOCUMENTS

| | | | |
|---|---|---|---|
| 5,058,175 A | * 10/1991 | Aso | 356/394 |
| 5,089,976 A | 2/1992 | Cate et al. | 364/526 |
| 5,149,960 A | 9/1992 | Dunne et al. | 250/226 |
| 5,463,480 A | 10/1995 | MacDonald et al. | 358/520 |
| 5,748,176 A | 5/1998 | Gondek | 345/131 |
| 5,760,913 A | 6/1998 | Falk | 358/298 |
| 6,067,366 A | * 5/2000 | Simanoysky et al. | 345/424 |
| 6,141,120 A | * 10/2000 | Falk | 358/504 |
| 6,160,634 A | * 12/2000 | Terashita | 358/1.9 |
| 6,178,254 B1 | * 1/2001 | Rappette et al. | 250/559.01 |
| 6,275,600 B1 | * 8/2001 | Banker et al. | 358/406 |
| 6,404,517 B1 | * 6/2002 | Chao | 358/406 |

OTHER PUBLICATIONS

R. Berns and M. Shyu, "Colorimetric characterization of a desktop drum scanner using a spectral model", Journal of Electronic Imaging, vol. 4(4), Oct. 1995, pp. 360–372.

* cited by examiner

Primary Examiner—Joseph Mancuso
Assistant Examiner—Anand Bhatnagar
(74) Attorney, Agent, or Firm—Fitzpatrick, Cella, Harper & Scinto

(57) ABSTRACT

Selection of pixels from a scanned image of a target document. The target document includes a plurality of color patches. The image includes a rectangular grid of pixels at least some of which correspond to a color patch on the target document. All of the selected pixels correspond to the color patch. The pixels of the image have color values associated therewith. A position in the image is determined which is expected to correspond to the color patch on the target document. An approximation is selected of pixels which correspond to the color patch at the determined position in the image. Groups of all pixels for a border of the approximation are successively discarded, thereby reducing an area of the approximation. The groups of pixels are successively discarded until a variance of color values is stabilized for pixels in the approximation.

150 Claims, 8 Drawing Sheets

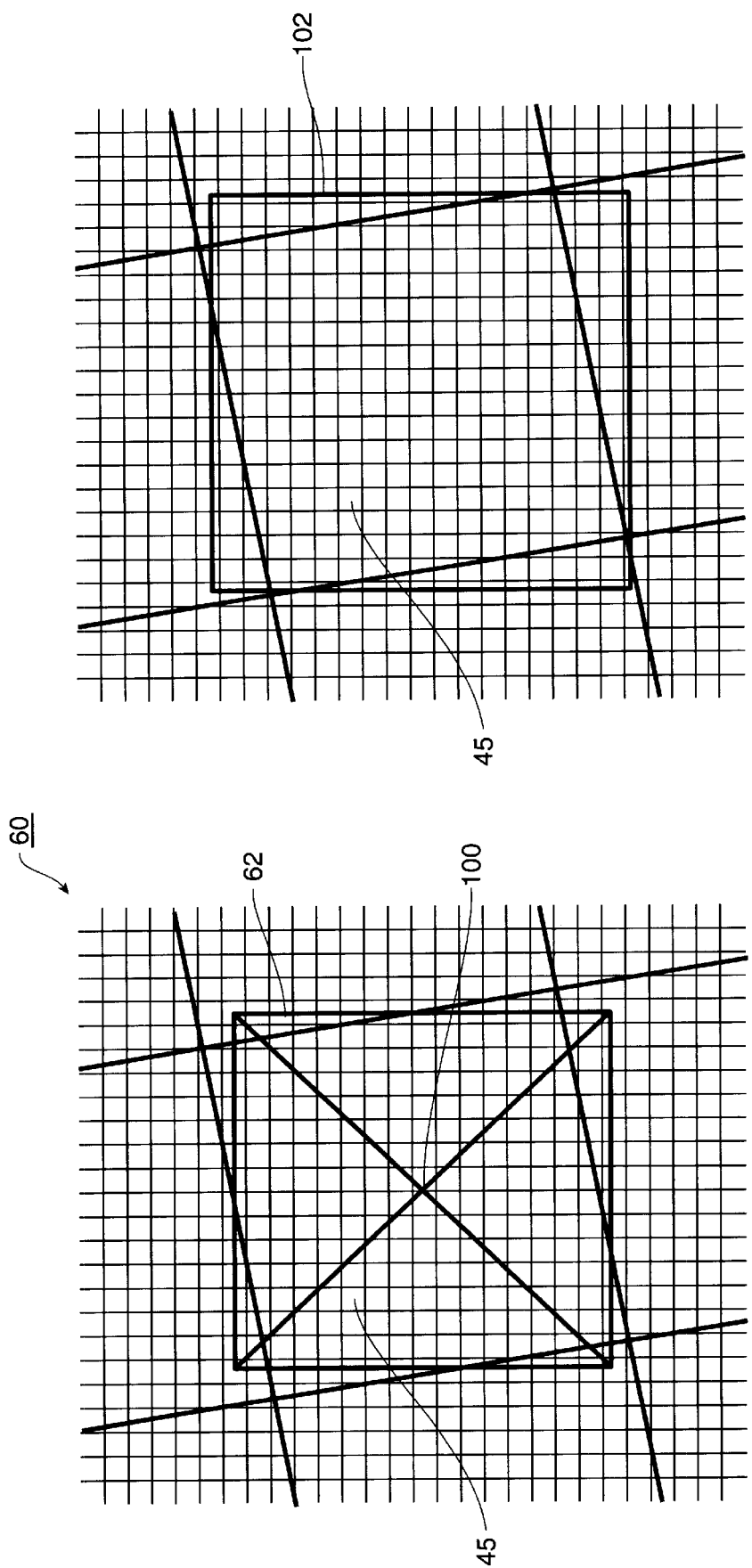

ITERATIVE APPROXIMATION OF COLOR PATCH AREA

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The invention is directed to selecting pixels from a target document image, in which the selected pixels correspond to one of plural color patches on a target document. More particularly, the invention concerns selecting the pixels by successively discarding groups of all pixels for a border of an area of the image that includes pixels corresponding to the color patch until a variance of color values is stabilized for pixels in the area.

2. Description of the Related Art

Due to variations in color devices such as color printers and color scanners, it is sometimes necessary to calibrate the color devices. One method of calibrating a color printer involves printing a series of color patches on a target document and then scanning the target document with a scanner whose color characteristics are known. The color values generated by the scanner for each color patch are used to determine a color measurement for each color patch. The resulting color measurements for the color patches then can be used to calibrate the color printer.

Likewise, a color scanner can be calibrated by scanning a target document which includes color patches that have known colors. Again, the color values generated by the scanner for each color patch are used to determine a color measurement for each color patch. The resulting color measurements for the color patches can be compared to the known colors, and the color scanner can be calibrated accordingly.

In calibration processes like those described above, it is necessary to obtain a color measurement for each of the color patches on the target document. In order to obtain the color measurement for each color patch, the scanned image of the target document is analyzed. In particular, the scanned image includes pixels organized into a rectangular grid. The color values for the pixels for a particular color patch are analyzed so as to determine a color measurement for the color patch.

One problem encountered in obtaining the color measurements is that the target document often is offset, skewed or otherwise distorted. In addition, the edges of color patches can be distorted by bleeding, dithering and anti-aliasing effects. As a result, the location of color patches, and in particular the location of the edges of the color patches, may not be known exactly. Because of these inaccuracies, it is possible for the color values attributed to a color patch to include color values for pixels from a border of the patch or from one or more adjacent color patches. These extraneous color values can lead to an improper color measurement for the color patch, which in turn can result in improper calibration of the scanner or printer.

Moreover, each color patch may include pixels of different colors, such as is produced by dithering or error diffusion. For example, colored and uncolored (white) pixels could be mixed in a single patch so as to produce a light version of the color. Thus, it may be necessary to include color values of such different colors when determining a color measurement for a given color patch. It is therefore not acceptable simply to discard color values which vary within a color patch.

Accordingly, a need exists for a method that determines which color values from scanning a target document actually are for pixels in each particular color patch, and which color values are for pixels outside the color patch. One conventional method is to determine a center of a color patch, and then to use color values for a sub-patch which includes a fixed portion of the color patch. For example, a sub-patch which is a rectangle covering 80% of the actual color patch could be utilized. However, this conventional approach can discard an unacceptably large amount of color values, particularly for a "good" scan without the foregoing problems, thereby degrading the precision of the color measurement for the color patch.

SUMMARY OF THE INVENTION

The invention addresses the foregoing deficiencies by determining a variance of color values for pixels in an approximation of pixels which correspond to a color patch in a target document. The approximation can be obtained based on an expected position of the color patch. Then, groups of all pixels for a border of the approximation are successively discarded, thereby reducing an area of the approximation, until a variance of color values is stabilized for pixels in the approximation.

By virtue of the foregoing, groups of border pixels are iteratively discarded from the approximation of the color patch until the variance of the color values for the approximation is stabilized. It has been found that discarding these border pixels results in good color measurements, at least partly because unwanted pixels tend to occur on the edges of a color patch. Thus, once the variance is stabilized, pixels from adjacent color patches are most likely discarded. In addition, because the iterations can stop with a significant non-zero variance, color patches which contain variously colored pixels are accommodated. As a result, more color values for a given color patch tend to be utilized than in conventional systems, while color values for pixels outside of the color patch are reliably discarded.

Accordingly, in one aspect the invention selects pixels from a scanned image of a target document. The target document includes a plurality of color patches. The image includes a rectangular grid of pixels at least some of which correspond to a color patch on the target document. All of the selected pixels correspond to the color patch. The pixels of the image have color values associated therewith.

According to the invention, a position in the image is determined which is expected to correspond to the color patch on the target document. An approximation is selected of pixels which correspond to the color patch at the determined position in the image. Groups of all pixels for a border of the approximation are successively discarded, thereby reducing an area of the approximation. The groups of pixels are successively discarded until a variance of color values is stabilized for pixels in the approximation. If a number of pixels in the approximation falls below a predetermined threshold, failure of the selection of pixels preferably is indicated.

Preferably, each time a group of all pixels for the border of the approximation is discarded, the border has a width of one pixel. The border can run around an entire periphery of the approximation. Alternatively, the border can be selected in turn from the top side, left side, bottom side and right side of the approximation.

Once the variance is stabilized, pixels in the approximation either before or after a most recent border has been discarded can be selected as pixels which all correspond to the color patch. A color measurement for the color patch can be determined from these selected pixels.

According to another aspect of the invention, the pixels for the color patch are selected by first determining a position in the image which is expected to correspond to a color patch on the target document. Then, an approximation of pixels which correspond to the color patch is selected at the determined position in the image. A first variance of color values is determined for the pixels in the selected approximation. A group of all pixels for a border of the approximation is discarded, thereby reducing an area of the approximation. A second variance of color values is determined for the pixels in reduced approximation. The two most recently determined variances are compared. In a case that the comparison indicates that the variance is not stabilized, the process is repeated so as to continue discarding groups of pixels and checking variances. In a case that the variance is stabilized, the pixels in the approximation either before or after a most recent discarding of border pixels are selected as pixels which all correspond to the color patch.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 10 is a representative view showing one method for determining a position in the image which is expected to correspond to a color patch on the target document.

FIG. 11 is a representative view showing a first approximation of pixels which correspond to a color patch on a target document.

DETAILED DESCRIPTION OF THE PREFERRED EMBODIMENTS

Figure 1:
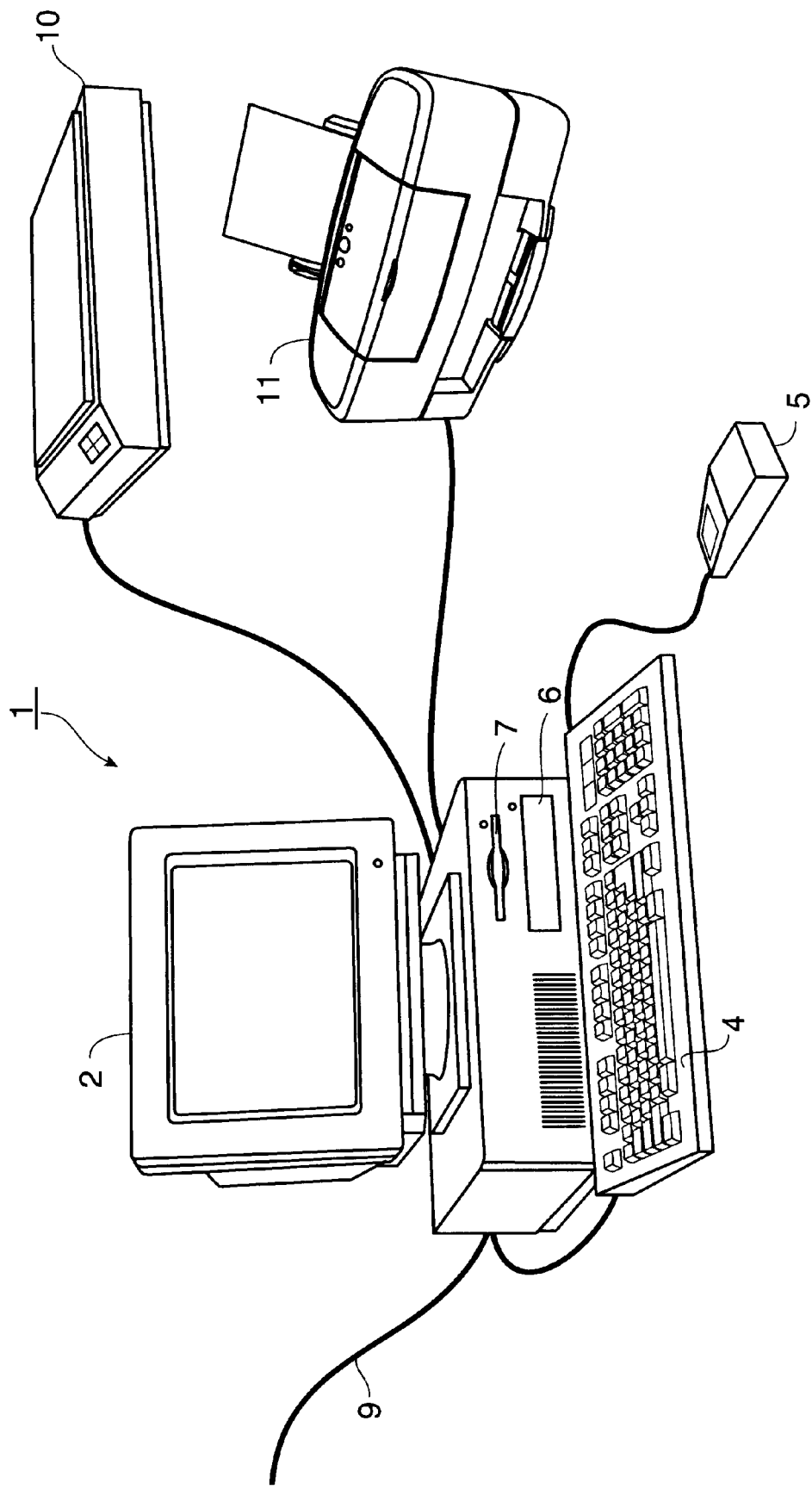
FIG. 1 is a representational view of a computer system in which the invention may be utilized.

FIG. 1 is a representational view of a computer system in which the invention may be utilized. Computer system 1 is preferably an IBM PC-compatible system executing Microsoft Windows98. Computer system 1 may be another type of system executing a windowing environment, such as a Macintosh or the like. Provided with computer system 1 are display 2, which is preferably a color monitor, keyboard 4 for entering user commands, and a pointing device such as mouse 5 for pointing to and for manipulating graphical user interfaces and other objects displayed on display 2.

Computer system 1 also includes a mass storage device such as fixed disk 6 for storing computer-executable process steps for a color calibration program according to the invention. Fixed disk 6 also stores an operating system, a printer driver, a scanner driver, other device drivers, a target document file, and the like for use in conjunction with the invention. The storage provided by fixed disk 6 may also be provided by a CD-ROM accessed via a CD-ROM drive (both not shown).

Floppy disk interface 7 is used to access files stored on floppy disks for direct loading into a Random Access Memory (RAM) of computer system 1, or into fixed disk 6. Computer-executable process steps, files and data also can be sent or retrieved over a network via network connection 9.

Although computer system 1 is depicted as a programmable general-purpose computer, the present invention can be implemented using a dedicated computer terminal or other type of data processing equipment.

Also provided with computer system 1 are color devices such as scanner 10 and printer 11. Scanner 10 is an image acquisition device which may be used to scan documents so as to provide color images of those documents to computer system 1. Printer 11 is provided for outputting color images.

Scanner 10 and printer 11 can be calibrated so as to compensate for variations between different color scanners and printers, and in particular between different makes and models of the color devices. One method of calibrating scanner 10 involves scanning a target document which includes color patches that have known colors. An example of a target document is explained below with respect to FIG. 3. Color values generated by scanner 10 for each color patch on the target document are used to determine a color measurement for each color patch. The resulting color measurements for the color patches can be compared to the known colors, and scanner 10 can be calibrated accordingly.

Likewise, if the color characteristics of scanner 10 are known, scanner 10 can be used to calibrate printer 11. One method of calibrating printer 11 involves using printer 11 to print a series of color patches for a target document such as the target document shown in FIG. 3. This target document can be printed based on a target document file stored on fixed disk 6. Then, the printed target document is scanned using scanner 10. The color values generated by scanner 10 for each color patch are used to determine a color measurement for each color patch. The resulting color measurements for the color patches then can be used to calibrate the printer 11.

In both of these calibration processes, it is necessary to obtain a color measurement for each scanned color patch of the target document. The present invention addresses problems which arise in making these color measurements, as explained in more detail below.

Figure 2:
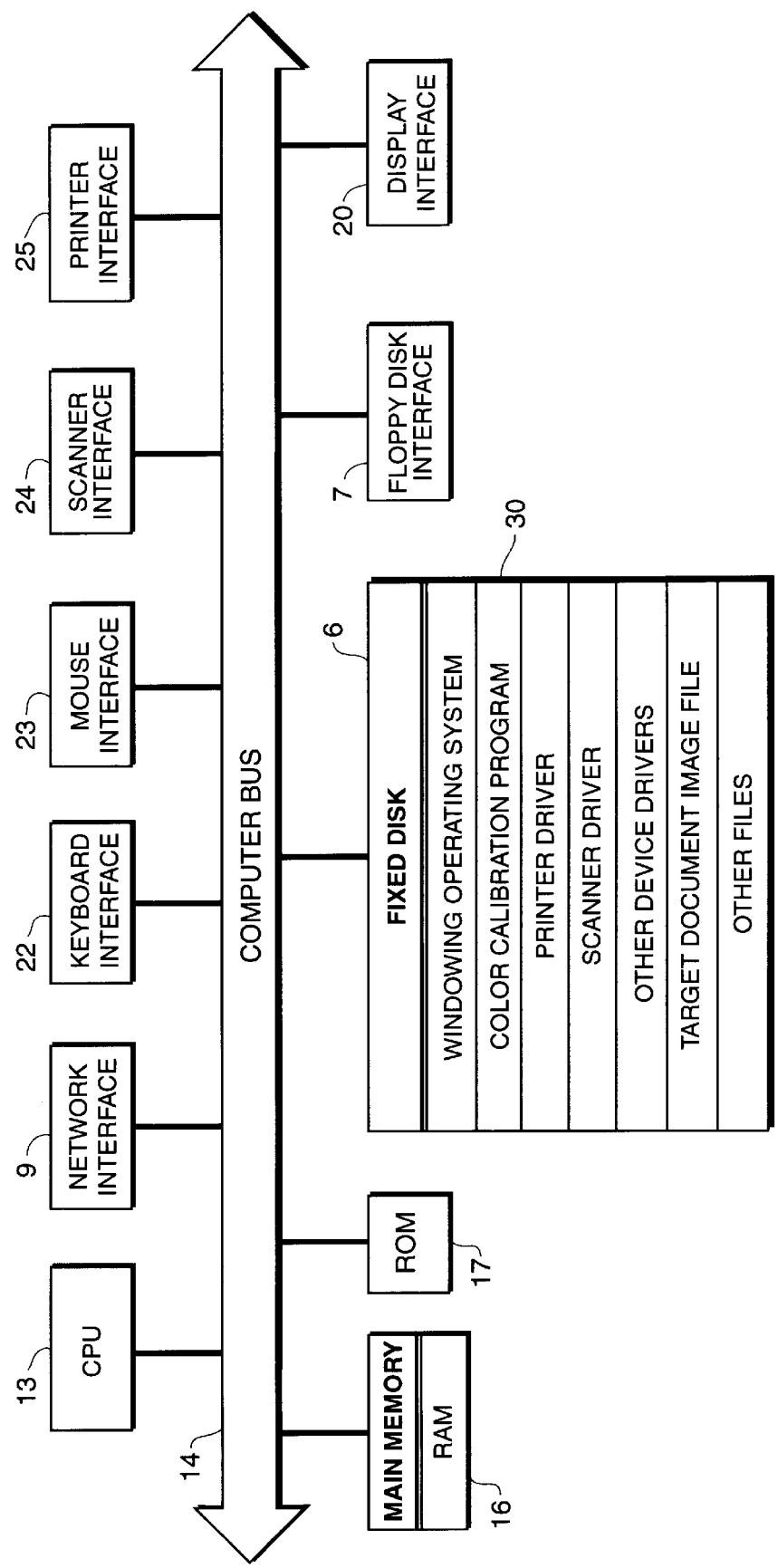
FIG. 2 is a detailed block diagram showing the internal architecture of the computer system shown in FIG. 1.

FIG. 2 is a detailed block diagram showing the internal architecture of computer system 1. As shown in FIG. 2, computer system 1 includes central processing unit (CPU) 13 which interfaces with computer bus 14. Also interfacing with computer bus 14 are fixed disk 6, network interface 9, main memory (RAM) 16, read only memory (ROM) 17, floppy disk interface 7, display interface 20 to monitor 2, keyboard interface 22 to keyboard 4, mouse interface 23 to mouse 5, scanner interface 24 to scanner 10, and printer interface 25 to printer 11.

Main memory 16 interfaces with computer bus 14 so as to provide RAM storage to CPU 13 during execution of an operating system, device drivers, and application programs such as a color calibration program according to the invention. More specifically, CPU 13 loads process steps into a region of main memory 16 from a computer readable medium such as fixed disk 6 or a floppy disk inserted into floppy disk interface 7, from another storage device, or from some other source such as a network. CPU 13 then executes the stored process steps from main memory 16 in order to execute the operating system, the device drivers, the application programs and the like. Data such as a scanned image, color measurements, known colors for a target document, and print data for a target document can be stored in main memory 16, where the data can be accessed by CPU 13 during execution of the process steps.

As also shown in FIG. 2, fixed disk 6 typically contains a windowing operating system, application programs such as color calibration program 30 according to the invention, device drivers including monitor, printer and scanner drivers, a target document image file, and other files. In the embodiment shown in FIG. 2, iterative approximation of color patches according to the invention is performed by color calibration program 30 during color calibration of a color device (e.g., scanner 10 or printer 11). However, the iterative approximation process need not be incorporated into a color calibration program. For example, the process could be embedded into the scanner or printer driver, the operating system, some other application program, or the like. Iterative approximation of color patches is explained in detail below with reference to FIGS. 7 to 11.

Figure 3:
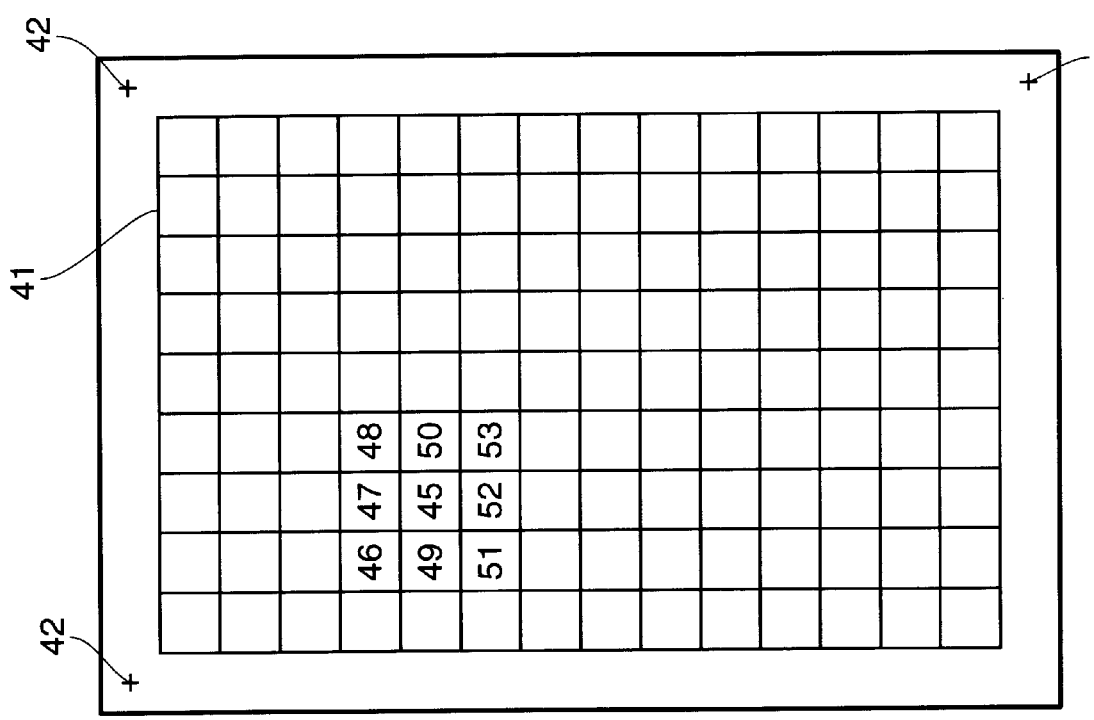
FIG. 3 is a representational view of a target document for use in calibration of color devices.

FIG. 3 is a representational view of target document 40 for use in calibration of color devices. As shown in FIG. 3, target document 40 includes an array of color patches 41. Optionally included are registration marks 42 for use in locating images of color patches in a scanned image of target document 40.

Each color patch on target document 40 typically has a different color. Therefore, when the target document is scanned by scanner 10, the areas of the resulting image corresponding to the different color patches have different color values. Color measurements derived from these color values can be used in color calibration of either scanner 10 or printer 11 (if printer 11 printed target document 40).

Color patch 45 is a representative color patch on target document 40. Color patch 45 is surrounded by color patches 46 through 53.

Figure 4:
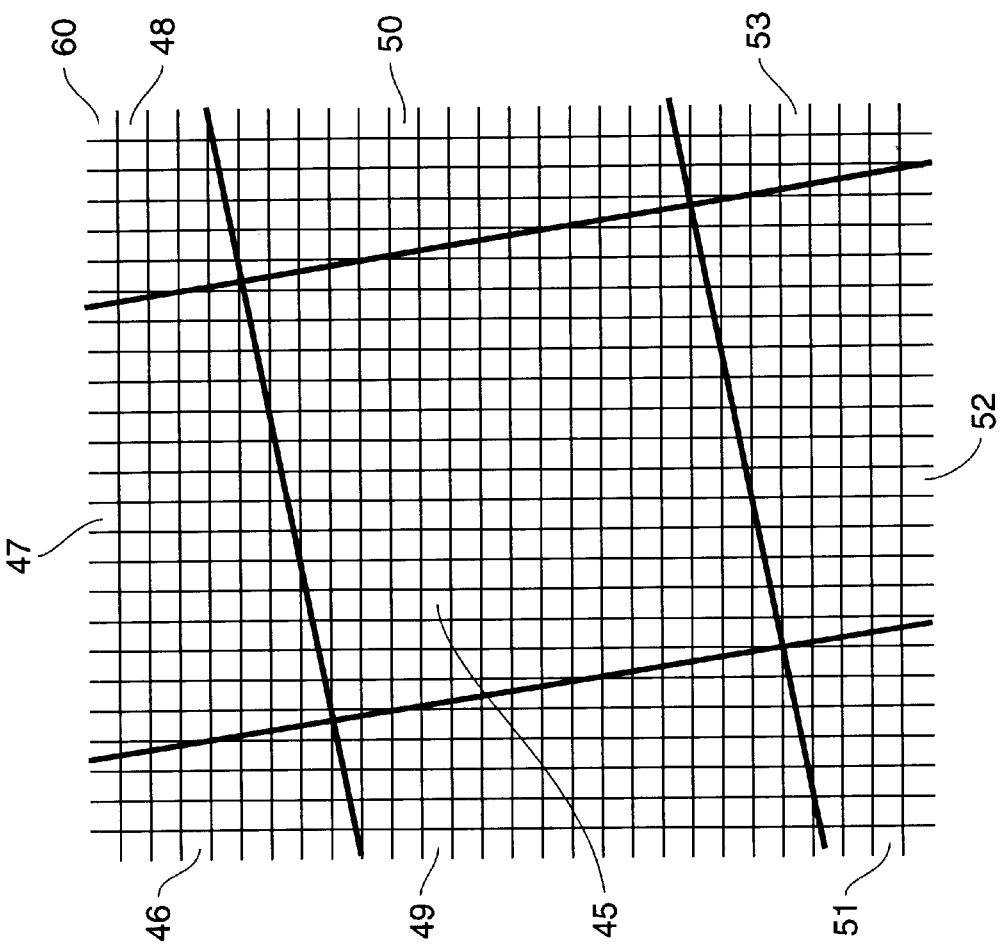
FIG. 4 is a representative view of a part of a scanned image corresponding to an area around a color patch on a target document.

FIG. 4 is a representative view of a part of a scanned image corresponding to an area around color patch 45 on target document 40. The small boxes in FIG. 4 represent individual pixels of scanned image 60. For the sake of clarity, the size of the pixels has been greatly exaggerated. Each pixel preferably has plural color values associated therewith, one for each of plural color components for the pixel. For example, each pixel could have a red color component value, a blue color component value and a green color component value associated therewith.

Superimposed on image 60 are corresponding portions of target document 40, namely color patch 45 and parts of surrounding color patches 46 through 53.

As shown in FIG. 4, image 60 of the color patches is skewed. Thus, the parts of the image corresponding to the edges of color patches 46 through 53 do not run horizontally and vertically, but rather run at angles. This skew is one type of distortion of image 60 which can leads to errors in making color measurements of color patches, as explained next.

Figure 5:
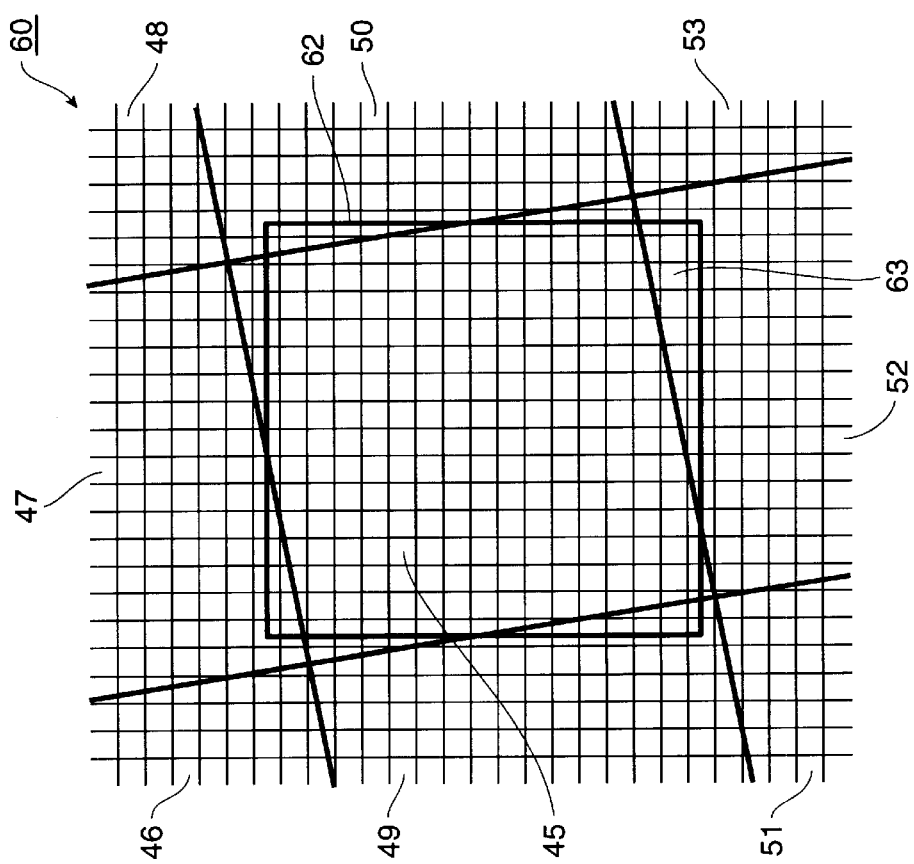
FIG. 5 is a representative view of an image area of a part of an image of a target document which a conventional technique might expect to correspond to a color patch.

FIG. 5 is a representative view of image area 62 of a part of image 60 which a conventional technique might expect to correspond to color patch 45. This expected image area could be calculated, for example, from the images of registration marks 42 in the scanned image.

As shown in FIG. 5, image area 62 not only includes pixels corresponding to color patch 45, but also includes pixels, such as pixels 63, corresponding to parts of surrounding color patches 46 through 53. Image area 62 includes these extraneous pixels due to, for example, skew, offset or other distortion in the scanned image. Thus, any color measurement for color patch 45 based on color values for all pixels in image area 62 would include color values for pixels corresponding to other color patches, namely color patches 46 through 53. These extraneous color values could lead to an improper color measurement for color patch 45, which in turn could result in improper calibration of scanner 10 or printer 11.

Figure 6:
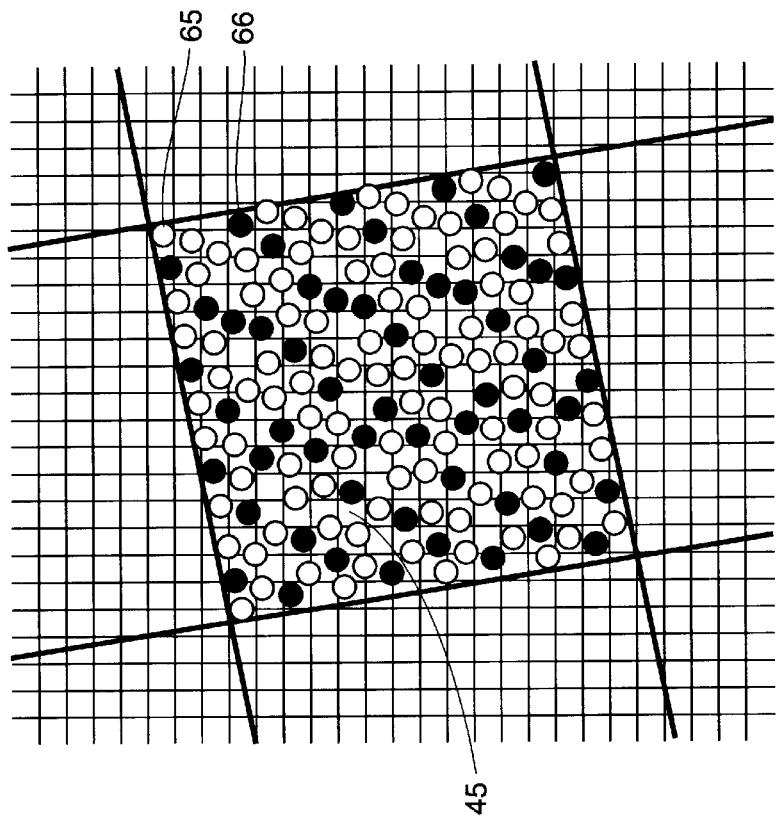
FIG. 6 is a representational view for explaining the effects on a color measurement of use of more than one ink, use of dithering and/or use of error diffusion in a color patch.

FIG. 6 is a representational view for explaining the effects of use of more than one ink, use of dithering and/or use of error diffusion in color patch 45. Similar effects can exist for all color patches on target document 40.

In FIG. 6, positions of ink droplets 65 and 66 are superimposed on the part of image 60 for color patch 45. The empty ink droplets represent ink of a first color, and the filled ink droplets represent ink of a second color. It is, of course, possible for more than two colors of ink to be present in color patch 45.

The ink droplets are distributed throughout color patch 45 based on, for example, an error diffusion or a dithering technique. Because the spatial frequency of the ink droplets does not necessarily match that of the pixels for the scanned image, each pixel can correspond to different amounts of the ink droplets. In addition, each pixel can correspond to none, one, or plural ink droplets. As a result, the pixels corresponding to color patch 45 have many different color values. Thus, in order to obtain an accurate color measurement for color patch 45, as large a number of pixels as possible should be used to determine the color measurement.

Furthermore, because pixels which all correspond to color patch 45 can have many different color values, it is not acceptable to simply discard all pixels with different color values. Thus, the process used to select the pixels must allow for selection of pixels whose color values exhibit a significant variance.

Figure 7:
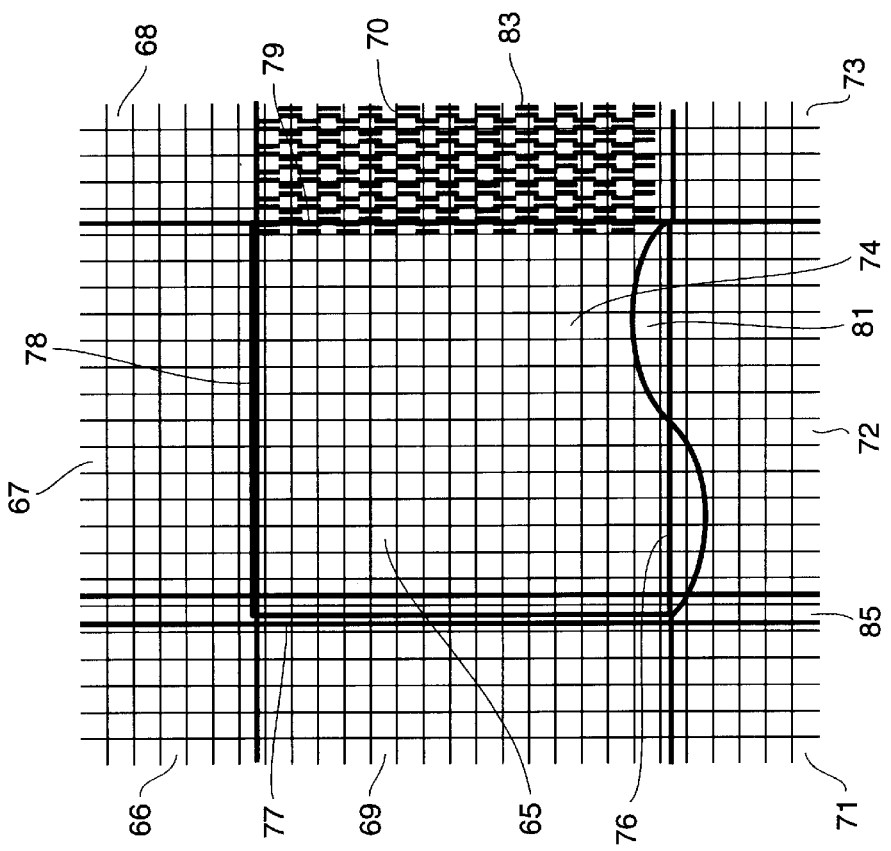
FIG. 7 is a representational view for explaining the effects on a color measurement of bleeding, dithering and/or anti-aliasing at edges of a color patch.

FIG. 7 is a representational view for explaining the effects of bleeding, dithering and/or anti-aliasing at edges of a color patch. Shown in FIG. 7 is color patch 65 surrounded by color patches 66 through 73. Image area 74 is a part of an image including the color patch which a conventional technique might be expected to included only pixels from color patch 65. In FIG. 7, image area 74 has a shape of a square with sides 76 through 79.

At a side of color patch 65 corresponding to side 76 of image area 74, ink for color patch 72 has bled into color patch 65 in bleeding region 81. Thus, any color measurement which is based on image area 74 will include pixels with color values affected by the color of color patch 72, thereby distorting the color measurement.

Likewise, at a side of color patch 65 corresponding to side 79 of image area 74, dithering 83 for color patch 70 has intruded past the edge of color patch 65. A similar effect at the edge could result from anti-aliasing at the border between color patches 65 and 70. If pixels which include color values affected by such dithering or anti-aliasing are used in calculating a color measurement for color patch 65, that color measurement could be distorted.

In addition, color patches are sometimes, but not always, separated by boundaries such as boundary 85. If the image of this boundary intrudes into image area 74, the color measurement for color patch 65 again could be distorted by color values for the boundary.

Figure 8:
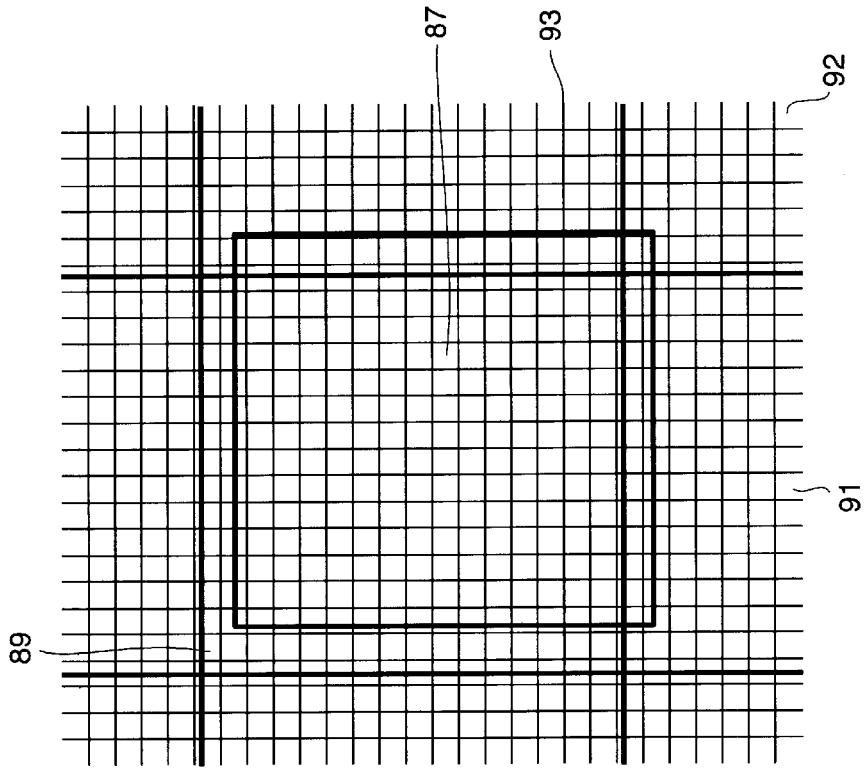
FIG. 8 is a representational view for explaining the effects on a color measurement of an improper estimate of a location of a color patch.

FIG. 8 illustrates a case wherein image area 87 for color patch 89 is misaligned. This misalignment could occur, for example, if a user misaligns the target document which contains the color patch. In particular, user input to a computer system sometimes is utilized during a registration process to align a target document. User error during this registration process can lead to an error such as that shown in FIG. 8.

Significantly, the misalignment as shown in FIG. 8 results in image area 87 including pixels which correspond to color patches adjacent to color patch 89, namely color patches 91, 92 and 93. These erroneously-included pixels also can lead to a distorted color measurement, despite a lack of other types of distortion in the color patches.

In order to address the foregoing issues and to increase the precision of color measurements for color patches, iterative approximation of a color patch area according to the invention attempts to discard pixels which include parts of color patches adjacent to a color patch for which a color measurement is needed.

In the following discussion of FIGS. 9 to 13, image area 60 shown in FIGS. 4 to 6 is used as an example. The invention is, of course, equally applicable to address the situations depicted in FIGS. 7 and 8, as well as other situations wherein pixels must be selected from an image which correspond to a color patch.

Figure 9:
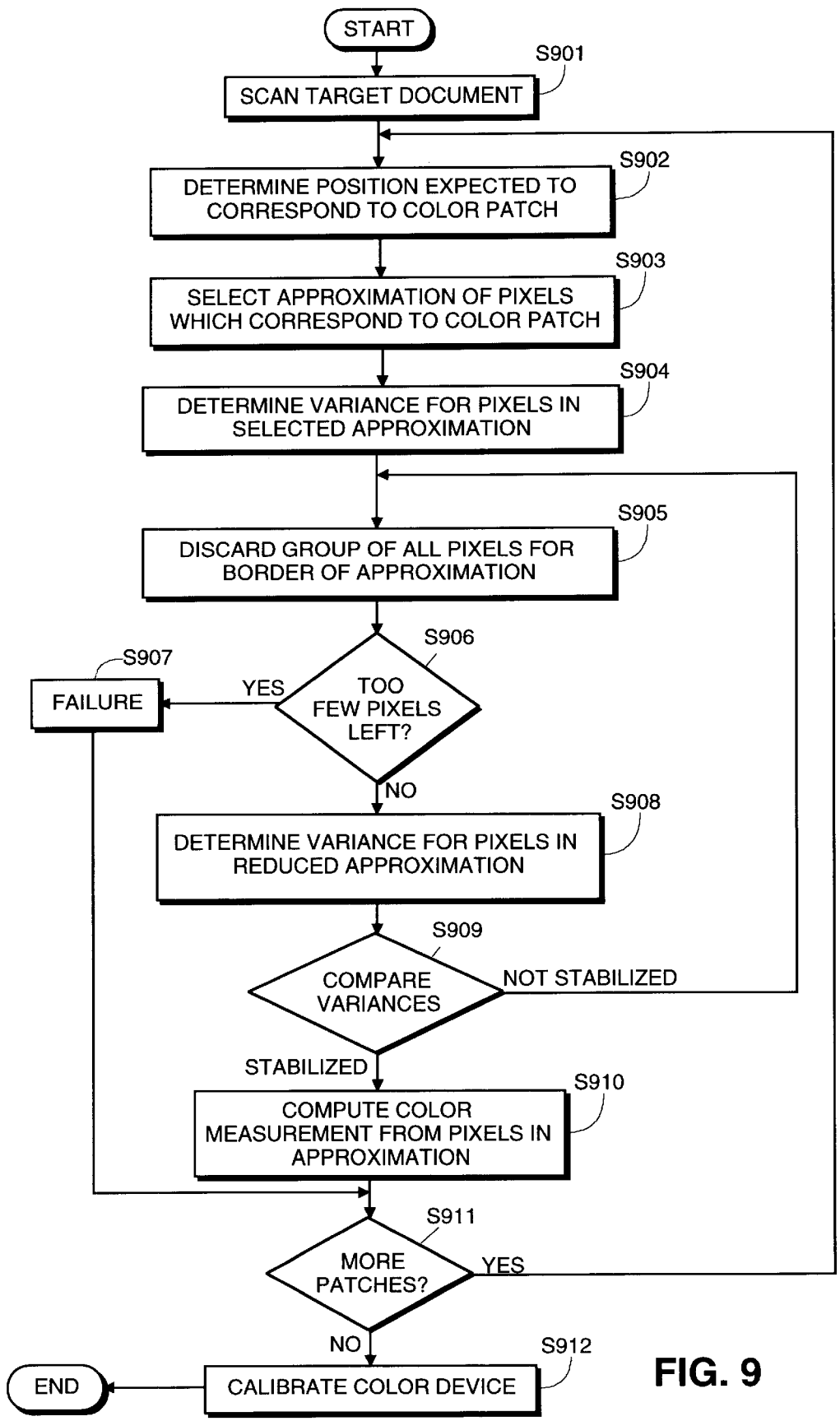
FIG. 9 is a flowchart for explaining iterative approximation of a color patch according to the invention.

FIG. 9 is a flowchart for explaining iterative approximation of a color patch according to the invention which addresses the foregoing issues.

Briefly, pixels are selected from a scanned image of a target document. The target document includes a plurality of color patches. The image includes a rectangular grid of pixels at least some of which correspond to a color patch on the target document. All of the selected pixels correspond to the color patch. The pixels of the image have color values associated therewith. A position in the image is determined which is expected to correspond to the color patch on the target document. An approximation is selected of pixels which correspond to the color patch at the determined position in the image. Groups of all pixels for a border of the approximation are successively discarded, thereby reducing an area of the approximation. The groups of pixels are successively discarded until a variance of color values is stabilized for pixels in the approximation. If a number of pixels in the approximation falls below a predetermined threshold, failure of the selection of pixels preferably is indicated.

In more detail, in step S901, target document 40 is scanned by scanner 10. Then, in step S902, a position is determined in image 60 which is expected to correspond to a color patch on target document 40. FIG. 10 is a representative view showing one method for making this determination.

In FIG. 10, image area 62 is a part of image 60 which might be expected to correspond to color patch 45. This expected image area could be calculated, for example, from the images of registration marks 42 in the scanned image, as explained above with reference to FIG. 3. Position 100 in the center of image area 62 is calculated, for example from the corners of image area 62. This position can be used as the position determined in step S902 which is expected to correspond to color patch 45.

In an alternative embodiment, image 60 can be displayed on a display such as display 2. A user can then designate a position in image 60, for example by using mouse 5 to designate a part of the image displayed on display 2.

In step S903, an approximation is selected of pixels which correspond to the color patch. FIG. 11 shown such an approximation, namely the pixels within the area 102. This approximation preferably corresponds to expected image area 62 discussed above.

A variance of color values for pixels within the selected approximation is determined in step S904, preferably based on standard deviations for the color values for the pixels. The standard deviations are determined for the color values for each color component of the pixels. For example, if the pixels have color values for red, green and blue color components, then a standard deviation is determined for the red color component values, a standard deviation is determined for the green color component values, and a standard deviation is determined for the blue color component values.

Then in the preferred embodiment, the standard deviations are used as the variance. According to this approach, the variance of the color values for the pixels comprises plural separate standard deviations for the color values, with a standard deviation determined for each color component of the color values. For example, the variance could be a triplet formed by the three separate standard deviations for the red, the green and the blue color component values.

It is also possible to combine the standard deviations so as to arrive at the variance for the pixels. The standard deviations can be combined by taking a square root of a sum of the squares of the standard deviations, by taking a sum or a product of the standard deviations, or by any other appropriate technique.

Other mathematical techniques, which may or may not be based on standard deviations, can be utilized to determine the variance. In particular, any mathematical technique can be utilized which yields decreasing result as the variance for the pixels stabilizes.

Figure 13:
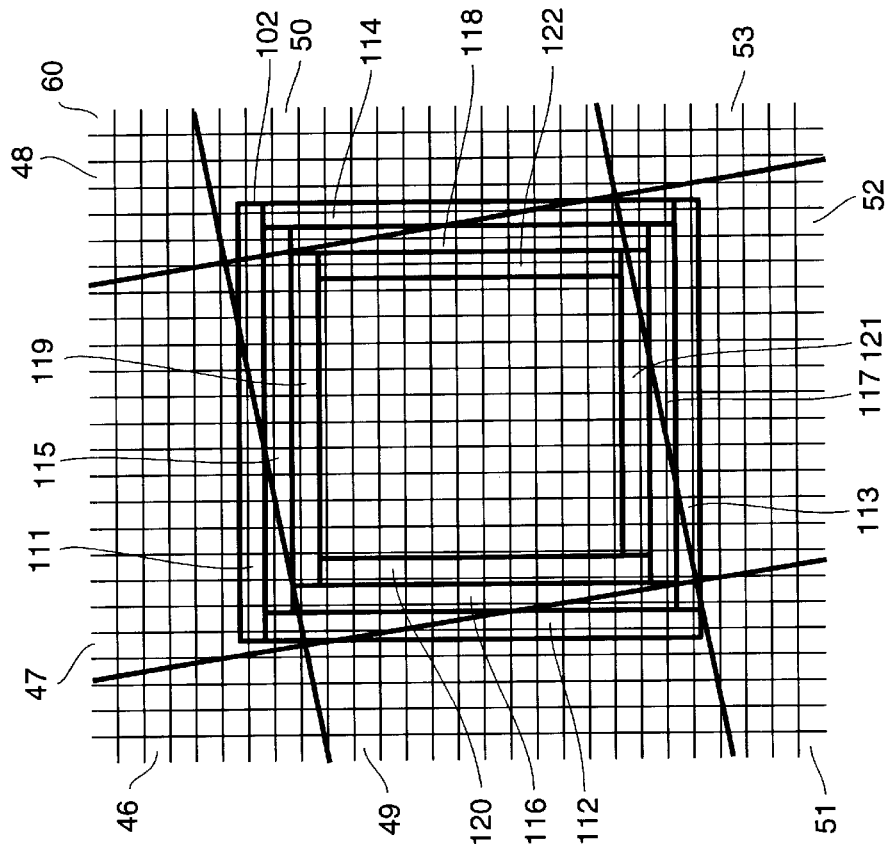
FIG. 13 is a representative view illustrating successive approximation for another embodiment of the invention, wherein the discarded border is selected in turn from the top side, left side, bottom side and right side of the approximation.
Figure 12:
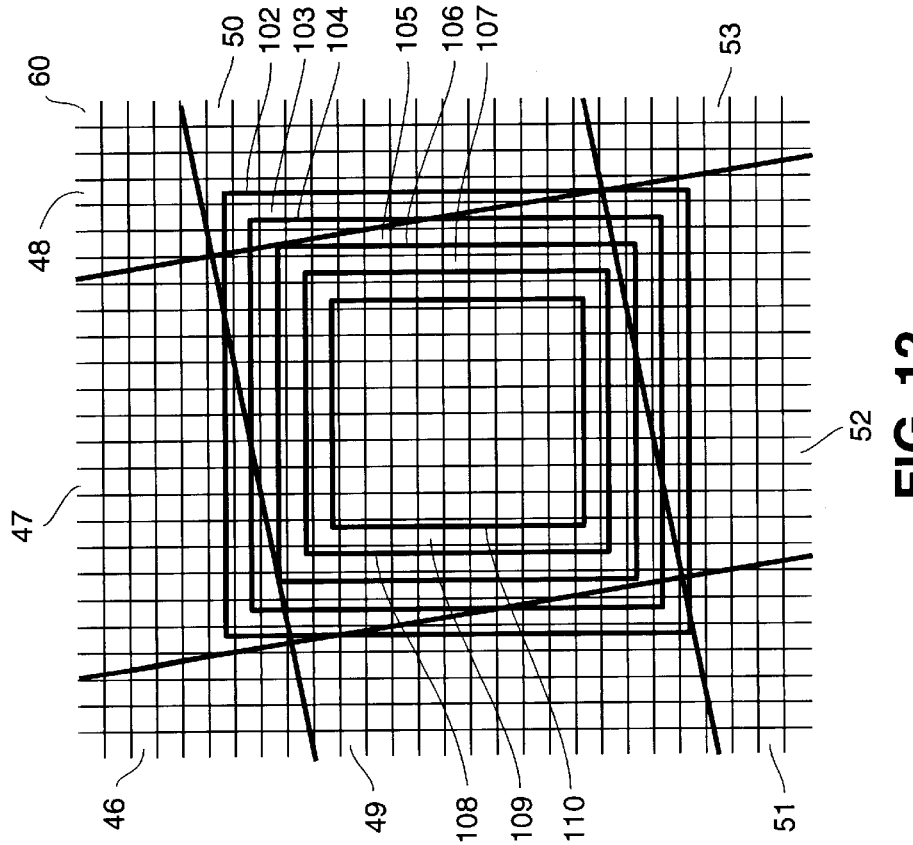
FIG. 12 is a representative view illustrating successive approximations for one embodiment of the invention, wherein a discarded border has a width of one pixel and runs around an entire periphery of the approximation.

In step S905, a group of all pixels for a border of the approximation is discarded. This border can be the entire border, preferably of width equal to one pixel, around all sides of the approximation, or the border can be one of the sides (again, preferably of width equal to one pixel) which are discarded in turn. This step reduces the area of the approximation, as illustrated in FIGS. 12 and 13 discussed below.

In step S906, it is determined if too few pixels remain, for example by reference to a threshold, in which case flow proceeds to step S907. An error ("Failure") is indicated for the color patch in step S907, and flow proceeds to step S911 for processing of more color patches.

If sufficient pixels remain in the approximation after step S906, flow proceeds to step S908, where a variance of color values for pixels in the reduced approximation is determined. Then, in step S909, the two most recently computed variances are compared to see if the variance for the approximation is stabilized. In the case that the variances comprise plural separate standard deviations (e.g., the variance is a triplet formed by the three separate standard deviations for the red, the green and the blue color component values), the variance preferably is stabilized when successive standard deviations for each color component vary by less than a predetermined threshold. For example, if the color components are red, green and blue, then the variance is stabilized when successive standard deviations for the red color component vary by less than the threshold, successive standard deviations for the green color component vary by less than the threshold, and successive standard deviations for the blue color component vary by less than the threshold.

Alternatively, in a case that the variances each comprise a single value representing combined standard deviations, the variance is stabilized when successive variance values defer by less than a predetermined threshold.

If the variance is not stabilized, flow returns to step S905, where another group of all pixels for a border of the approximation are discarded. This process repeats until the variance stabilizes, in which case flow proceeds to step S910.

In step S910, a color measurement for the color patch is calculated from the color values of the pixels in the approximation. In one embodiment, so as to maximize the number of pixels in the approximation, the approximation from before a most recent iteration of step S905 (where a border is discarded) can be utilized. However, it is acceptable to use the most recent approximation, even though that approximation does not include pixels for a discarded border which did not adversely affect the stability of the variance.

In the preferred embodiment, the color measurement comprises a set of averages of the color values for the color components of the pixels. For example, the color measurement could comprise a triplet including the average red value, the average blue value, and the average green value for pixels in the selected approximation.

In the case that standard deviations are used to determine variances, these averages preferably are computed as part of the standard deviation calculations. Thus, at least two sets of averages are computed before a comparison of variances is performed. One of these sets is for an approximation before a most recent border has been discarded, and the other is for an approximation after a most recent border has been discarded. Either of these sets of averages can be used as the color measurement for the color patch.

In step S911, it is determined if more color patches need to be processed. For example, in the preferred embodiment, all patches on target document 40 are processed. If more patches need to be processed, flow returns to step S902 for the next color patch. Otherwise, the color device is calibrated in step S912 based on the color is measurements for the color patches.

By virtue of the foregoing, groups of border pixels are iteratively discarded from the approximation of the color patch until the variance of the color values for the approximation is stabilized. Because the variance is stabilized, pixels from adjacent color patches are most likely discarded. Because the iterations can stop with a significant non-zero variance, color patches which result in variously colored pixels are accommodated. As a result, more color values for a given color patch tend to be utilized than in conventional systems, while color values for pixels outside of the color patch tend to be discarded.

FIG. 12 is a representative view illustrating successive approximations for one embodiment of the invention, wherein a discarded border has a width of one pixel and runs around an entire periphery of the approximation. In FIG. 12, the first approximation is approximation 102. After a variance is computed for approximation 102, border 103 around the entire periphery of the approximation is discarded, leaving approximation 104.

Approximations 102 and 104 contain significantly different numbers. of pixels corresponding to color patches 46 through 53 surrounding color patch 45. As a result, the variances of color values for the approximations should vary widely, leading to another border being discarded. Accordingly, border 105 is discarded, resulting in approximation 106. Likewise, border 107 is discarded, resulting in approximation 108, and border 109 is discarded, resulting in approximation 110.

Approximations 108 and 110 both include only pixels corresponding to the color patch 45. Thus, the variances for these approximations should be close to each other. In other words, the variance is stabilized between approximations 108 and 110. Therefore, both approximation 108 and approximation 110 can be used to select pixels corresponding to color patch 45, and a good color measurement based on color values for the pixels should result.

FIG. 13 is a representative view illustrating successive approximation for another embodiment of the invention, wherein the discarded border is selected in turn from the top side, left side, bottom side and right side of the approximation. of course, any order of discarding the sides will result in an equivalent result. In FIG. 13, the first approximation is approximation 102. The borders discarded due to an unstabilized variance proceed as follows: top border 111, left border 112, bottom border 113, right border 114, top border 115, left border 116, bottom border 117, right border 118, top border 119, left border 120, bottom border 121, and right border 122. The approximations before and after pixels for border 122 are discarded both include only pixels corresponding to color patch 45. Accordingly, the variances for these approximations should be close to each other, indicating that the variance is stabilized. Thus, pixels in the either of the approximations can be used for the color measurement of color patch 45.

One representative example of an implementation of steps S904 through S910 is shown in the C-language source code included in the Appendix to this specification.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

APPENDIX

```
/* Copyright © 1999 Canon Information Systems, Inc.
 *
 * THE COPYRIGHT OWNER HAS NO OBJECTION TO THE
 * FACSIMILE REPRODUCTION BY ANYONE OF THE PATENT
 * DOCUMENT OR THE PATENT DISCLOSURE, AS IT APPEARS
 * IN THE PATENT AND TRADEMARK OFFICE PATENT FILE OR
 * RECORDS, BUT OTHERWISE RESERVES ALL COPYRIGHT
 * RIGHTS WHATSOEVER.
 *
 * THIS SOFTWARE IS PROVIDED "AS=IS" WITHOUT
 * WARRANTY OF ANY KIND, EXPRESS, IMPLIED, OR
 * OTHERWISE, INCLUDING WITHOUT LIMITATION, ANY
```

APPENDIX-continued

```
 * WARRANTY OF MERCHANTABILITY OR FITNESS FOR A
 * PARTICULAR PURPOSE. IN NO EVENT SHALL CANON
 * INFORMATION SYSTEMS, INC. BE LIABLE FOR ANY
 * SPECIAL, INCIDENTAL, INDIRECT OR CONSEQUENTIAL
 * DAMAGES OF ANY KIND, OR ANY DAMAGES WHATSOEVER
 * RESULTING FROM LOSS OF USE, DATA OR PROFITS,
 * WHETHER OR NOT ADVISED OF THE POSSIBILITY OF
 * DAMAGE, AND ON ANY THEORY OF LIABILITY, ARISING
 * OUT OF OR IN CONNECTION WITH THE USE OR
 * PERFORMANCE OF THIS SOFTWARE
 */
/* gather up pixel values within the area desired,
 * remembering to handle the skew and offset.
 * Average these, and compute the standard
 * deviation. If the standard deviation is too
 * large, something is wrong.
 */
#define MINPIXELS (100)   /* Minimum number of pixels
                              that we need */
BOOL GetMeas (
    Data* IT8,
    Point* topLeft,         /* x and y of the top
                               left */
    Point* bottomRight,     /* x and y of the bottom
                               right */
    RGBData* meas,          /* Holds the result (RGB)
                               if successful */
    const char* nameBuff)
{
    unsigned char* pRow;
        /* Points to current row in input raster */
    double sumRed, sumGreen, sumBlue;
        /* Sums for computing average (mean) */
    int nPixels;
        /* Holds number of pixels that we've used*/
    double avgRed, avgGreen, avgBlue;
        /* Hold the averages (means) */
    double red, green, blue;
        /* R, G, and B (in floating point */
    unsigned char* pixel;
        /* points to current pixel (R, G, B) */
    int row, col;
        /* row and column of current pixel */
    int top = topLeft—>y,
        /* top row being looked at */
        left = topLeft—>x,
        /* left column being looked at */
        bottom = bottomRight—>y,
        /* bottom row being looked at */
        right = bottomRight—>x;
        /* right column being looked at */
    BOOL status = TRUE;  /* return status value */
    int iterations = 1;    /* interation counter */
    BOOL test;             /* flag used to test for
                              failure or success */
    double ssRed, ssGreen, ssBlue;
        /* std dev for current iteration */
    double ssr1 = -1,
        /* std dev from previous iteration */
            ssg1 = -1,
            ssb1 = -1;
    meas—>R = meas—>G = meas—>B = 0;
        /* Set to standard value in case of
           failure */
    while (TRUE)
    {
        nPixels = 0;
        sumRed = sumGreen = sumBlue = 0;
        /* Compute the average */
        for (row = top; row <= bottom; ++row)
        {
            pRow = IT8—>m_raster + row *
IT8—>m_imgWidth * 3;
            for (col = left; col <= right; ++col)
            {
                pixel = pRow+3*col;
                red = (double) (*pixel++);
                green = (double) (*pixel++);
                blue = (double) (*pixel++);
                sumRed += red;
                sumGreen += green;
                sumBlue += blue;
                ++nPixels;
            }
        }
        if (nPixels <= MINPIXELS)
        {
            status = FALSE;
                /* Not enough pixels to make a
                   meaningful measurement */
            break;
        }
        /* Compute the averages from the sums */
        avgRed = sumRed / nPixels;
        avgGreen = sumGreen / nPixels;
        avgBlue = sumBlue / nPixels;
        ssRed = ssGreen = ssBlue = 0;
        /* Compute the standard deviation */
        for (row = top; row <= bottom; ++row)
        {
            pRow = IT8—>m_raster + row *
IT8—>m_imgWidth * 3;
            for (col = left; col <= right; ++col)
            {
                pixel = pRow + 3*col;
                red = *pixel++;
                green = *pixel++;
                blue = *pixel++;
                red -= avgRed;
                ssRed += red*red;
                green -= avgGreen;
                ssGreen += green*green;
                blue -= avgBlue;
                ssBlue += blue*blue;
            }
        }
        ssRed /= nPixels; ssGreen /= nPixels;
ssBlue /= nPixels;
        ssRed = sqrt (ssRed); ssGreen = sqrt
(ssGreen); ssBlue = sqrt (ssBlue);
        test = FALSE;
        /* Test: standard deviation of all three
           components is less than 1 */
        test |= (ssRed < 1.0 && ssGreen < 1.0 &&
ssBlue < 1.0);
        /* Test: standard deviation has stopped
           decreasing */
        test |= (fabs(ssr1-ssRed)<1.0 &&
fabs(ssg1-ssGreen)<1.0 && fabs(ssb1-ssBlue)<1.0);
        /* Continue until (test) succeeds */
        if (test)
            break;
        /* Save std. dev from this iteration for
           test next time */
        ssr1 = ssRed; ssg1 = ssGreen; ssb1 =
ssBlue;
        /* 'shrink' the area on all four sides */
        ++top;
        --bottom;
        ++left;
        --right;
        ++iterations;
    }
    if (status == TRUE)
    {
        meas—>R = (int)avgRed;
        meas—>G = (int)avgGreen;
        meas—>B = (int)avgBlue;
    }
    return status;
}
```

What is claimed is:

1. A method for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the method comprising the steps of:

determining a position in the image which is expected to correspond to the color patch on the target document;

selecting an approximation of pixels which correspond to the color patch at the determined position in the image; and successively discarding groups of all pixels for a border of the approximation, thereby reducing an area of the approximation, wherein the groups of pixels are successively discarded until a variance of color values is stabilized for pixels in the approximation.

2. A method according to claim 1, wherein in a case that the variance is stabilized, the pixels in the approximation after a most recent border has been discarded are selected as pixels which all correspond to the color patch.

3. A method according to claim 2, wherein a color measurement for the color patch is computed from the selected pixels.

4. A method according to claim 1, wherein in a case that the variance is stabilized, the pixels in the approximation before a most recent border has been discarded are selected as pixels which all correspond to the color patch.

5. A method according to claim 4, wherein a color measurement for the color patch is computed from the selected pixels.

6. A method according to claim 1, wherein the border has a width of one pixel.

7. A method according to claim 6, wherein the border runs around an entire periphery of the approximation.

8. A method according to claim 6, wherein the border is selected in turn from the top side, left side, bottom side and right side of the approximation.

9. A method according to claim 1, wherein the variance of the color values comprises plural separate standard deviations for the color values, with a standard deviation determined for each color component of the color values, and wherein the variance is stabilized when successive standard deviations for each color component vary by less than a predetermined threshold.

10. A method according to claim 1, wherein the variance of the color values is determined by determining plural standard deviations for the color values for the pixels, with a standard deviation determined for each color component of the pixels, and then combining the standard deviations to arrive at the variance, and wherein the variance is stabilized when successive variances differ by less than a predetermined threshold.

11. A method according to claim 10, wherein the standard deviations are combined by computing a square root of a sum of squares of the standard deviations.

12. A method according to claim 10, wherein the standard deviations are combined by computing a sum of the standard deviations.

13. A method according to claim 10, wherein the standard deviations are combined by computing a product of the standard deviations.

14. A method according to claim 1, wherein the variance of the color values is determined by any mathematical technique which yields a decreasing result as the variance stabilizes.

15. A method according to claim 1, further comprising the step of indicating failure if a number of pixels in the approximation falls below a predetermined threshold.

16. A method for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the method comprising:

a determining step to determine a position in the image which is expected to correspond to the color patch on the target document;

a selecting step to select an approximation of pixels which correspond to the color patch at the determined position in the image;

a first variance determining step to determine a first variance of color values for the pixels in the selected approximation;

a discarding step to discard a group of all pixels for a border of the approximation, thereby reducing an area of the approximation;

a second variance determining step to determine a second variance of color values for the pixels in reduced approximation; and a comparing step to compare the two most recently determined variances, wherein in a case that the comparison indicates that the variance is not stabilized, the discarding, second variance determining and comparing steps are repeated.

17. A method according to claim 16, wherein in a case that the variance is stabilized, the pixels in the approximation after a most recent performance of the discarding step are selected as pixels which all correspond to the color patch.

18. A method according to claim 17, wherein a color measurement for the color patch is computed from the selected pixels.

19. A method according to claim 16, wherein in a case that the variance is stabilized, the pixels in the approximation before a most recent performance of the discarding step are selected as pixels which all correspond to the color patch.

20. A method according to claim 19, wherein a color measurement for the color patch is computed from the selected pixels.

21. A method according to claim 16, wherein the border has a width of one pixel.

22. A method according to claim 21, wherein the border runs around an entire periphery of the approximation.

23. A method according to claim 21, wherein the border is selected in turn from the top side, left side, bottom side and right side of the approximation.

24. A method according to claim 16, wherein the variance of the color values comprises plural separate standard deviations for the color values, with a standard deviation determined for each color component of the color values, and wherein the variance is stabilized when standard deviations for each color component for the first variance and for the second variance vary by less than a predetermined threshold.

25. A method according to claim 16, wherein the variance of the color values is determined by determining plural standard deviations for the color values for the pixels, with a standard deviation determined for each color component of the pixels, and then combining the standard deviations to arrive at the variance, and wherein the variance is stabilized when the two most recently determined variances differ by less than a predetermined threshold.

26. A method according to claim 25, wherein the standard deviations are combined by computing a square root of a sum of squares of the standard deviations.

27. A method according to claim 25, wherein the standard deviations are combined by computing a sum of the standard deviations.

28. A method according to claim 25, wherein the standard deviations are combined by computing a product of the standard deviations.

29. A method according to claim 16, wherein the variance of the color values is determined by any mathematical technique which yields a decreasing result as the variance stabilizes.

30. A method according to claim 16, further comprising a failure indicating step to indicate failure if a number of pixels in the approximation falls below a predetermined threshold.

31. An apparatus for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the apparatus comprising:
a memory including a region for storing executable process steps; and
a processor for executing the executable process steps;
wherein the executable process steps include the steps of:
(a) determining a position in the image which is expected to correspond to the color patch on the target document; (b) selecting an approximation of pixels which correspond to the color patch at the determined position in the image; and (c) successively discarding groups of all pixels for a border of the approximation, thereby reducing an area of the approximation, wherein the groups of pixels are successively discarded until a variance of color values is stabilized for pixels in the approximation.

32. An apparatus according to claim 31, wherein in a case that the variance is stabilized, the pixels in the approximation after a most recent border has been discarded are selected as pixels which all correspond to the color patch.

33. An apparatus according to claim 32, wherein a color measurement for the color patch is computed from the selected pixels.

34. An apparatus according to claim 31, wherein in a case that the variance is stabilized, the pixels in the approximation before a most recent border has been discarded are selected as pixels which all correspond to the color patch.

35. An apparatus according to claim 34, wherein a color measurement for the color patch is computed from the selected pixels.

36. An apparatus according to claim 31, wherein the border has a width of one pixel.

37. An apparatus according to claim 36, wherein the border runs around an entire periphery of the approximation.

38. An apparatus according to claim 36, wherein the border is selected in turn from the top side, left side, bottom side and right side of the approximation.

39. An apparatus according to claim 31, wherein the variance of the color values comprises plural separate standard deviations for the color values, with a standard deviation determined for each color component of the color values, and wherein the variance is stabilized when successive standard deviations for each color component vary by less than a predetermined threshold.

40. An apparatus according to claim 31, wherein the variance of the color values is determined by determining plural standard deviations for the color values for the pixels, with a standard deviation determined for each color component of the pixels, and then combining the standard deviations to arrive at the variance, and
wherein the variance is stabilized when successive variances differ by less than a predetermined threshold.

41. An apparatus according to claim 40, wherein the standard deviations are combined by computing a square root of a sum of squares of the standard deviations.

42. An apparatus according to claim 40, wherein the standard deviations are combined by computing a sum of the standard deviations.

43. An apparatus according to claim 40, wherein the standard deviations are combined by computing a product of the standard deviations.

44. An apparatus according to claim 31, wherein the variance of the color values is determined by any mathematical technique which yields a decreasing result as the variance stabilizes.

45. An apparatus according to claim 31, wherein the executable process steps further comprise the step of indicating failure if a number of pixels in the approximation falls below a predetermined threshold.

46. An apparatus for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the apparatus comprising:
a memory including a region for storing executable process steps; and
a processor for executing the executable process steps;
wherein the executable process steps include: (a) a determining step to determine a position in the image which is expected to correspond to the color patch on the target document; (b) a selecting step to select an approximation of pixels which correspond to the color patch at the determined position in the image; (c) a first variance determining step to determine a first variance of color values for the pixels in the selected approximation; (d) a discarding step to discard a group of all pixels for a border of the approximation, thereby reducing an area of the approximation; (e) a second variance determining step to determine a second variance of color values for the pixels in reduced approximation; and (f) a comparing step to compare the two most recently determined variances, wherein in a case that the comparison indicates that the variance is not stabilized, the discarding, second variance determining and comparing steps are repeated.

47. An apparatus according to claim 46, wherein in a case that the variance is stabilized, the pixels in the approximation after a most recent performance of the discarding step are selected as pixels which all correspond to the color patch.

48. An apparatus according to claim 47, wherein a color measurement for the color patch is computed from the selected pixels.

49. An apparatus according to claim 46, wherein in a case that the variance is stabilized, the pixels in the approximation before a most recent performance of the discarding step are selected as pixels which all correspond to the color patch.

50. An apparatus according to claim 49, wherein a color measurement for the color patch is computed from the selected pixels.

51. An apparatus according to claim 46, wherein the border has a width of one pixel.

52. An apparatus according to claim 51, wherein the border runs around an entire periphery of the approximation.

53. An apparatus according to claim 51, wherein the border is selected in turn from the top side, left side, bottom side and right side of the approximation.

54. An apparatus according to claim 46, wherein the variance of the color values comprises plural separate standard deviations for the color values, with a standard deviation determined for each color component of the color values, and wherein the variance is stabilized when standard deviations for each color component for the first variance and for the second variance vary by less than a predetermined threshold.

55. An apparatus according to claim 46, wherein the variance of the color values is determined by determining plural standard deviations for the color values for the pixels, with a standard deviation determined for each color component of the pixels, and then combining the standard deviations to arrive at the variance, and wherein the variance is stabilized when the two most recently determined variances differ by less than a predetermined threshold.

56. An apparatus according to claim 55, wherein the standard deviations are combined by computing a square root of a sum of squares of the standard deviations.

57. An apparatus according to claim 55, wherein the standard deviations are combined by computing a sum of the standard deviations.

58. An apparatus according to claim 55, wherein the standard deviations are combined by computing a product of the standard deviations.

59. An apparatus according to claim 46, wherein the variance of the color values is determined by any mathematical technique which yields a decreasing result as the variance stabilizes.

60. An apparatus according to claim 46, wherein the executable process steps further comprise a failure indicating step to indicate failure if a number of pixels in the approximation falls below a predetermined threshold.

61. Computer-executable process steps stored on a computer-readable medium, the computer, executable process steps for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the computer-executable process steps comprising:

code to determine a position in the image which is expected to correspond to the color patch on the target document;

code to select an approximation of pixels which correspond to the color patch at the determined position in the image; and code to discard successively groups of all pixels for a border of the approximation, thereby reducing an area of the approximation, wherein the groups of pixels are successively discarded until a variance of color values is stabilized for pixels in the approximation.

62. Computer-executable process steps according to claim 61, wherein in a case that the variance is stabilized, the pixels in the approximation after a most recent border has been discarded are selected as pixels which all correspond to the color patch.

63. Computer-executable process steps according to claim 62, wherein a color measurement for the color patch is computed from the selected pixels.

64. Computer-executable process steps according to claim 61, wherein in a case that the variance is stabilized, the pixels in the approximation before a most recent border has been discarded are selected as pixels which all correspond to the color patch.

65. Computer-executable process steps according to claim 64, wherein a color measurement for the color patch is computed from the selected pixels.

66. Computer-executable process steps according to claim 61, wherein the border has a width of one pixel.

67. Computer-executable process steps according to claim 66, wherein the border runs around an entire periphery of the approximation.

68. Computer-executable process steps according to claim 66, wherein the border is selected in turn from the top side, left side, bottom side and right side of the approximation.

69. Computer-executable process steps according to claim 61, wherein the variance of the color values comprises plural separate standard deviations for the color values, with a standard deviation determined for each color component of the color values, and wherein the variance is stabilized when successive standard deviations for each color component vary by less than a predetermined threshold.

70. Computer-executable process steps according to claim 61, wherein the variance of the color values is determined by determining plural standard deviations for the color values for the pixels, with a standard deviation determined for each color component of the pixels, and then combining the standard deviations to arrive at the variance, and wherein the variance is stabilized when successive variances differ by less than a predetermined threshold.

71. Computer-executable process steps according to claim 70, wherein the standard deviations are combined by computing a square root of a sum of squares of the standard deviations.

72. Computer-executable process steps according to claim 70, wherein the standard deviations are combined by computing a sum of the standard deviations.

73. Computer-executable process steps according to claim 70, wherein the standard deviations are combined by computing a product of the standard deviations.

74. Computer-executable process steps according to claim 61, wherein the variance of the color values is determined by any mathematical technique which yields a decreasing result as the variance stabilizes.

75. Computer-executable process steps according to claim 61, further comprising code to indicate failure if a number of pixels in the approximation falls below a predetermined threshold.

76. Computer-executable process steps for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the computer-executable process steps comprising:

determining code to determine a position in the image which is expected to correspond to the color patch on the target document;

selecting code to select an approximation of pixels which correspond to the color patch at the determined position in the image;

first variance determining code to determine a first variance of color values for the pixels in the selected approximation;

discarding code to discard a group of all pixels for a border of the approximation, thereby reducing an area of the approximation;

second variance determining code to determine a second variance of color values for the pixels in reduced approximation; and comparing code to compare the two most recently determined variances, wherein in a case that the comparison indicates that the variance is not stabilized, execution of the discarding code, second variance determining code and comparing code is repeated.

77. Computer-executable process steps according to claim 76, wherein in a case that the variance is stabilized, the pixels in the approximation after a most recent performance of the discarding code are selected as pixels which all correspond to the color patch.

78. Computer-executable process steps according to claim 77, wherein a color measurement for the color patch is computed from the selected pixels.

79. Computer-executable process steps according to claim 76, wherein in a case that the variance is stabilized, the pixels in the approximation before a most recent performance of the discarding code are selected as pixels which all correspond to the color patch.

80. Computer-executable process steps according to claim 79, wherein a color measurement for the color patch is computed from the selected pixels.

81. Computer-executable process steps according to claim 76, wherein the border has a width of one pixel.

82. Computer-executable process steps according to claim 81, wherein the border runs around an entire periphery of the approximation.

83. Computer-executable process steps according to claim 81, wherein the border is selected in turn from the top side, left side, bottom side and right side of the approximation.

84. Computer-executable process steps according to claim 76, wherein the variance of the color values comprises plural separate standard deviations for the color values, with a standard deviation determined for each color component of the color values, and wherein the variance is stabilized when standard deviations for each color component for the first variance and for the second variance vary by less than a predetermined threshold.

85. Computer-executable process steps according to claim 76, wherein the variance of the color values is determined by determining plural standard deviations for the color values for the pixels, with a standard deviation determined for each color component of the pixels, and then combining the standard deviations to arrive at the variance, and wherein the variance is stabilized when the two most recently determined variances differ by less than a predetermined threshold.

86. Computer-executable process steps according to claim 85, wherein the standard deviations are combined by computing a square root of a sum of squares of the standard deviations.

87. Computer-executable process steps according to claim 85, wherein the standard deviations are combined by computing a sum of the standard deviations.

88. Computer-executable process steps according to claim 85, wherein the standard deviations are combined by computing a product of the standard deviations.

89. Computer-executable process steps according to claim 76, wherein the variance of the color values is determined by any mathematical technique which yields a decreasing result as the variance stabilizes.

90. Computer-executable process steps according to claim 76, further comprising failure indicating code to indicate failure if a number of pixels in the approximation falls below a predetermined threshold.

91. A computer-readable medium which stores computer-executable process steps, the computer-executable process steps for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the computer-executable process steps comprising:

a determining step to determine a position in the image which is expected to correspond to the color patch on the target document;

a selecting step to select an approximation of pixels which correspond to the color patch at the determined position in the image; and a discarding step to discard successively groups of all pixels for a border of the approximation, thereby reducing an area of the approximation, wherein the groups of pixels are successively discarded until a variance of color values is stabilized for pixels in the approximation.

92. A computer-readable medium according to claim 91, wherein in a case that the variance is stabilized, the pixels in the approximation after a most recent border has been discarded are selected as pixels which all correspond to the color patch.

93. A computer-readable medium according to claim 92, wherein a color measurement for the color patch is computed from the selected pixels.

94. A computer-readable medium according to claim 91, wherein in a case that the variance is stabilized, the pixels in the approximation before a most recent border has been discarded are selected as pixels which all correspond to the color patch.

95. A computer-readable medium according to claim 94, wherein a color measurement for the color patch is computed from the selected pixels.

96. A computer-readable medium according to claim 91, wherein the border has a width of one pixel.

97. A computer-readable medium according to claim 96, wherein the border runs around an entire periphery of the approximation.

98. A computer-readable medium according to claim 96, wherein the border is selected in turn from the top side, left side, bottom side and right side of the approximation.

99. A computer-readable medium according to claim 91, wherein the variance of the color values comprises plural separate standard deviations for the color values, with a standard deviation determined for each color component of the color values, and wherein the variance is stabilized when successive standard deviations for each color component vary by less than a predetermined threshold.

100. A computer-readable medium according to claim 91, wherein the variance of the color values is determined by determining plural standard deviations for the color values for the pixels, with a standard deviation determined for each color component of the pixels, and then combining the standard deviations to arrive at the variance, and wherein the variance is stabilized when successive variances differ by less than a predetermined threshold.

101. A computer-readable medium according to claim 100, wherein the standard deviations are combined by computing a square root of a sum of squares of the standard deviations.

102. A computer-readable medium according to claim 100, wherein the standard deviations are combined by computing a sum of the standard deviations.

103. A computer-readable medium according to claim 100, wherein the standard deviations are combined by computing a product of the standard deviations.

104. A computer-readable medium according to claim 91, wherein the variance of the color values is determined by any mathematical technique which yields a decreasing result as the variance stabilizes.

105. A computer-readable medium according to claim 91, wherein the computer-executable process steps further comprise a failure indicating step to indicate failure if a number of pixels in the approximation falls below a predetermined threshold.

106. A computer-readable medium which stores computer-executable process steps, the computer-executable process steps for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the computer-executable process steps comprising:
  a determining step to determine a position in the image which is expected to correspond to the color patch on the target document;
  a selecting step to select an approximation of pixels which correspond to the color patch at the determined position in the image;
  a first variance determining step to determine a first variance of color values for the pixels in the selected approximation;
  a discarding step to discard a group of all pixels for a border of the approximation, thereby reducing an area of the approximation;
  a second variance determining step to determine a second variance of color values for the pixels in reduced approximation; and
  a comparing step to compare the two most recently determined variances, wherein in a case that the comparison indicates that the variance is not stabilized, the discarding, second variance determining and comparing steps are repeated.

107. A computer-readable medium according to claim 106, wherein in a case that the variance is stabilized, the pixels in the approximation after a most recent performance of the discarding step are selected as pixels which all correspond to the color patch.

108. A computer-readable medium according to claim 107, wherein a color measurement for the color patch is computed from the selected pixels.

109. A computer-readable medium according to claim 106, wherein in a case that the variance is stabilized, the pixels in the approximation before a most recent performance of the discarding step are selected as pixels which all correspond to the color patch.

110. A computer-readable medium according to claim 109, wherein a color measurement for the color patch is computed from the selected pixels.

111. A computer-readable medium according to claim 106, wherein the border has a width of one pixel.

112. A computer-readable medium according to claim 111, wherein the border runs around an entire periphery of the approximation.

113. A computer-readable medium according to claim 111, wherein the border is selected in turn from the top side, left side, bottom side and right side of the approximation.

114. A computer-readable medium according to claim 106, wherein the variance of the color values comprises plural separate standard deviations for the color values, with a standard deviation determined for each color component of the color values, and wherein the variance is stabilized when standard deviations for each color component for the first variance and for the second variance vary by less than a predetermined threshold.

115. A computer-readable medium according to claim 106, wherein the variance of the color values is determined by determining plural standard deviations for the color values for the pixels, with a standard deviation determined for each color component of the pixels, and then combining the standard deviations to arrive at the variance, and
  wherein the variance is stabilized when the two most recently determined variances differ by less than a predetermined threshold.

116. A computer-readable medium according to claim 115, wherein the standard deviations are combined by computing a square root of a sum of squares of the standard deviations.

117. A computer-readable medium according to claim 115, wherein the standard deviations are combined by computing a sum of the standard deviations.

118. A computer-readable medium according to claim 115, wherein the standard deviations are combined by computing a product of the standard deviations.

119. A computer-readable medium according to claim 116, wherein the variance of the color values is determined by any mathematical technique which yields a decreasing result as the variance stabilizes.

120. A computer-readable medium according to claim 116, wherein the computer-executable process steps further comprise a failure indicating step to indicate failure if a number of pixels in the approximation falls below a predetermined threshold.

121. An apparatus for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the apparatus comprising:
  determining means for determining a position in the image which is expected to correspond to the color patch on the target document;
  selecting means for selecting an approximation of pixels which correspond to the color patch at the determined position in the image; and
  discarding means for successively discarding groups of all pixels for a border of the approximation, thereby reducing an area of the approximation, wherein the groups of pixels are successively discarded until a variance of color values is stabilized for pixels in the approximation.

122. An apparatus according to claim 121, wherein in a case that the variance is stabilized, the pixels in the approximation after a most recent border has been discarded are selected as pixels which all correspond to the color patch.

123. An apparatus according to claim 122, wherein a color measurement for the color patch is computed from the selected pixels.

124. An apparatus according to claim 121, wherein in a case that the variance is stabilized, the pixels in the approximation before a most recent border has been discarded are selected as pixels which all correspond to the color patch.

125. An apparatus according to claim 124, wherein a color measurement for the color patch is computed from the selected pixels.

126. An apparatus according to claim 121, wherein the border has a width of one pixel.

127. An apparatus according to claim 126, wherein the border runs around an entire periphery of the approximation.

128. An apparatus according to claim 126, wherein the border is selected in turn from the top side, left side, bottom side and right side of the approximation.

129. An apparatus according to claim 121, wherein the variance of the color values comprises plural separate standard deviations for the color values, with a standard deviation determined for each color component of the color values, and wherein the variance is stabilized when successive standard deviations for each color component vary by less than a predetermined threshold.

130. An apparatus according to claim 121, wherein the variance of the color values is determined by determining plural standard deviations for the color values for the pixels, with a standard deviation determined for each color component of the pixels, and then combining the standard deviations to arrive at the variance, and wherein the variance is stabilized when successive variances differ by less than a predetermined threshold.

131. An apparatus according to claim 130, wherein the standard deviations are combined by computing a square root of a sum of squares of the standard deviations.

132. An apparatus according to claim 130, wherein the standard deviations are combined by computing a sum of the standard deviations.

133. An apparatus according to claim 130, wherein the standard deviations are combined by computing a product of the standard deviations.

134. An apparatus according to claim 121, wherein the variance of the color values is determined by any mathematical technique which yields a decreasing result as the variance stabilizes.

135. An apparatus according to claim 121, further comprising failure indicating means for indicating failure if a number of pixels in the approximation falls below a predetermined threshold.

136. An apparatus for selecting pixels from a scanned image of a target document, the target document including a plurality of color patches, the image including a rectangular grid of pixels at least some of which correspond to a color patch on the target document, all of the selected pixels corresponding to the color patch, the pixels of the image having color values associated therewith, the apparatus comprising:

determining means for determining a position in the image which is expected to correspond to the color patch on the target document;

selecting means for selecting an approximation of pixels which correspond to the color patch at the determined position in the image;

first variance determining means for determining a first variance of color values for the pixels in the selected approximation;

discarding means for discarding a group of all pixels for a border of the approximation, thereby reducing an area of the approximation;

second variance determining means for determining a second variance of color values for the pixels in reduced approximation; and comparing means for comparing the two most recently determined variances, wherein in a case that the comparison indicates that the variance is not stabilized, the discarding, second variance determining and comparing steps are repeated.

137. An apparatus according to claim 136, wherein in a case that the variance is stabilized, the pixels in the approximation after a most recent performance of the discarding step are selected as pixels which all correspond to the color patch.

138. An apparatus according to claim 137, wherein a color measurement for the color patch is computed from the selected pixels.

139. An apparatus according to claim 136, wherein in a case that the variance is stabilized, the pixels in the approximation before a most recent performance of the discarding step are selected as pixels which all correspond to the color patch.

140. An apparatus according to claim 139, wherein a color measurement for the color patch is computed from the selected pixels.

141. An apparatus according to claim 136, wherein the border has a width of one pixel.

142. An apparatus according to claim 141, wherein the border runs around an entire periphery of the approximation.

143. An apparatus according to claim 141, wherein the border is selected in turn from the top side, left side, bottom side and right side of the approximation.

144. An apparatus according to claim 136, wherein the variance of the color values comprises plural separate standard deviations for the color values, with a standard deviation determined for each color component of the color values, and wherein the variance is stabilized when standard deviations for each color component for the first variance and for the second variance vary by less than a predetermined threshold.

145. An apparatus according to claim 136, wherein the variance of the color values is determined by determining plural standard deviations for the color values for the pixels, with a standard deviation determined for each color component of the pixels, and then combining the standard deviations to arrive at the variance, and wherein the variance is stabilized when the two most recently determined variances differ by less than a predetermined threshold.

146. An apparatus according to claim 145, wherein the standard deviations are combined by computing a square root of a sum of squares of the standard deviations.

147. An apparatus according to claim 145, wherein the standard deviations are combined by computing a sum of the standard deviations.

148. An apparatus according to claim 145, wherein the standard deviations are combined by computing a product of the standard deviations.

149. An apparatus according to claim 136, wherein the variance of the color values is determined by any mathematical technique which yields a decreasing result as the variance stabilizes.

150. An apparatus according to claim 136, further comprising failure indicating means for indicating failure if a number of pixels in the approximation falls below a predetermined threshold.

* * * * *

UNITED STATES PATENT AND TRADEMARK OFFICE
CERTIFICATE OF CORRECTION

PATENT NO. : 6,512,845 B1
DATED : January 28, 2003
INVENTOR(S) : John S. Haikin et al.

It is certified that error appears in the above-identified patent and that said Letters Patent is hereby corrected as shown below:

Title page,
Item [56], References Cited, U.S. PATENT DOCUMENTS,
"Simanoysky et al." should read -- Simanovsky et al. --.

Column 7,
Line 2, "to included" should read -- to include --.

Column 10,
Line 13, "numbers." should read -- numbers --;
Line 32, "of course," should read -- Of course, --; and
Line 43, "the either" should read -- either --.

Column 17,
Line 43, "computer, executable" should read -- computer-executable --.

Signed and Sealed this

Seventh Day of October, 2003

JAMES E. ROGAN
*Director of the United States Patent and Trademark Office*